United States Patent [19]

McMahan

[11] 3,973,988

[45] Aug. 10, 1976

[54] TRAILER WASHING APPARATUS

[76] Inventor: Richard C. McMahan, P.O. Box 428, La Salle, Colo. 80645

[22] Filed: Jan. 17, 1975

[21] Appl. No.: 541,714

[52] U.S. Cl. ................................. 134/46; 134/52; 134/103; 134/123; 134/168 R
[51] Int. Cl.² ...................... B08B 3/02; B60S 3/04; B60S 9/08
[58] Field of Search ................. 134/46, 52, 45, 103, 134/123, 167 R, 168 R, 176, 179; 15/1.7

[56] References Cited
UNITED STATES PATENTS

| | | | |
|---|---|---|---|
| 1,628,141 | 5/1927 | Gray | 134/168 R X |
| 2,933,093 | 4/1960 | Handyside | 134/168 R |
| 3,258,019 | 6/1966 | Bellas et al. | 134/123 X |
| 3,291,145 | 12/1966 | Arneson | 134/167 R |
| 3,481,346 | 12/1969 | McBurnett | 134/45 |
| 3,534,746 | 10/1970 | Posner | 134/46 |
| 3,860,020 | 1/1975 | King, Jr. | 134/176 X |

FOREIGN PATENTS OR APPLICATIONS 1,079,978  4/1960  Germany ............................. 34/123

Primary Examiner—Robert L. Bleutge
Attorney, Agent, or Firm—Horace B. Van Valkenburgh; Frank C. Lowe

[57] ABSTRACT

A carriage is driven from the back to the front of the inside of a trailer, either by rotating nozzles which discharge wash water against the inside of the trailer or by an electric motor. The carriage is guided by two laterally spaced rollers on each side. A hose supplying the wash water and later the rinse water, to the nozzles on the carriage, unwinds from a reel while the carriage is driven into the trailer, but the reel is turned by a motor to pull the carriage rearwardly of and out of the trailer. The trailer rests on an inclined ramp, with the rear edges abutting resilient pads for sealing purposes, the pads being placed around an opening in a partition in the building in which the carriage is housed. A wash tank receives liquid draining from the inside of the trailer, both wash water and rinse water, while a boiler heats the wash water. A rinse tank is replenished by an outside water line, while the water from both the wash tank and the rinse tank is pumped to a special connection of the reel for passage through the hose to the nozzles.

4 Claims, 7 Drawing Figures

TRAILER WASHING APPARATUS

This invention relates to trailer washing apparatus, and more particularly to apparatus for washing the inside of large over-the-road trailers which are usually driven by a tractor. The invention is particularly adapted for use in washing trailers which have been used for hauling meat, but may be utilized for trailers which have been used for hauling other products.

It has been proposed, as in U.S. Pat. No. 3,534,746, to utilize a portable cleaner having a frame which supports a rectangular configuration of piping, with spray nozzles directed laterally from each of the pipes. The frame is propelled into and out of the trailer by a reversible electric motor. However, these spray nozzles are not adapted to wash the front wall of the trailer and require adjustment for trailers of different heights.

In accordance with the present invention, the washing solution is directed onto the side walls of the trailer by centrally disposed rotating nozzles, so that a different height or width of one trailer from another is immaterial, since the rotating nozzles can discharge against the inside walls of a lower or higher, or a wider or narrower trailer. In addition, the nozzles are positioned to provide a reaction at least from a pair of opposed pipes, so that the rotation of the nozzles may be utilized in moving a carriage along the inside of the trailer to the front wall thereof. The carriage is preferably returned from the front wall by rotating a reel spaced from the trailer, on which the hose supplying the cleaning solution is wound. This reel is automatically unwound as the carriage moves into the trailer. In addition, provision is made for rinsing the trailer, either on a separate trip of the carriage or on the return trip of the carriage. The building in which the trailer is cleaned also has a separate wash tank boiler for heating the wash water, a clear water rinse tank, pumps for supplying the wash water and the rinse water alternatively to the nozzles and a sand trap beneath the trailer into which the wash water tank may be drained.

Additional features and advantages of this invention will become apparent from the description which follows, taken in conjunction with the accompanying drawings, in which.

Figure 2:
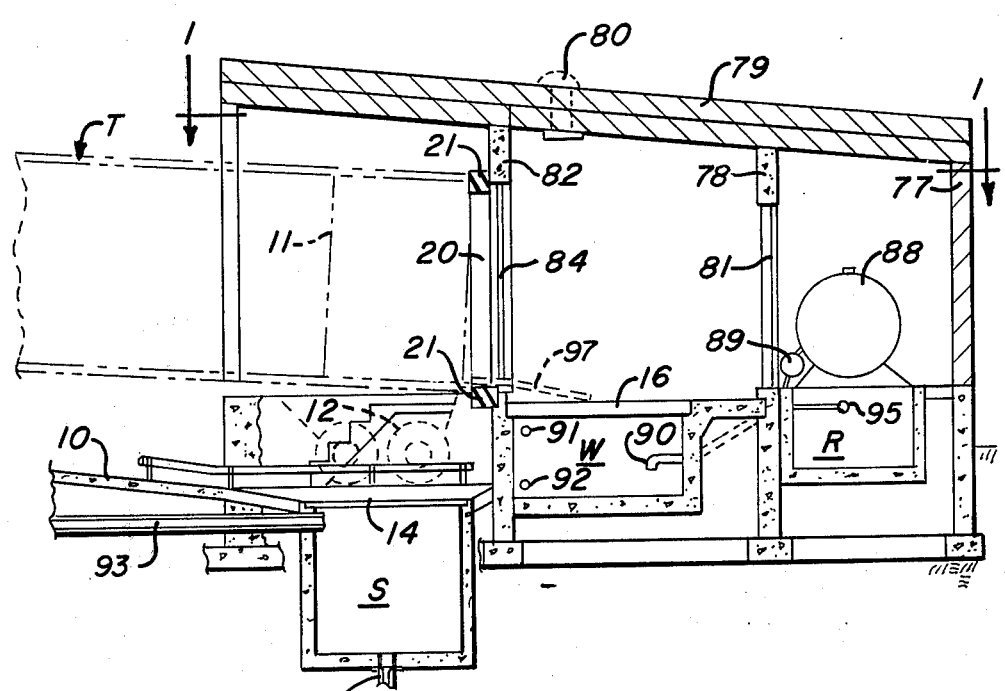
FIG. 2 is a longitudinal, vertical section, taken along offset line 2—2 of FIG. 1.
Figure 3:
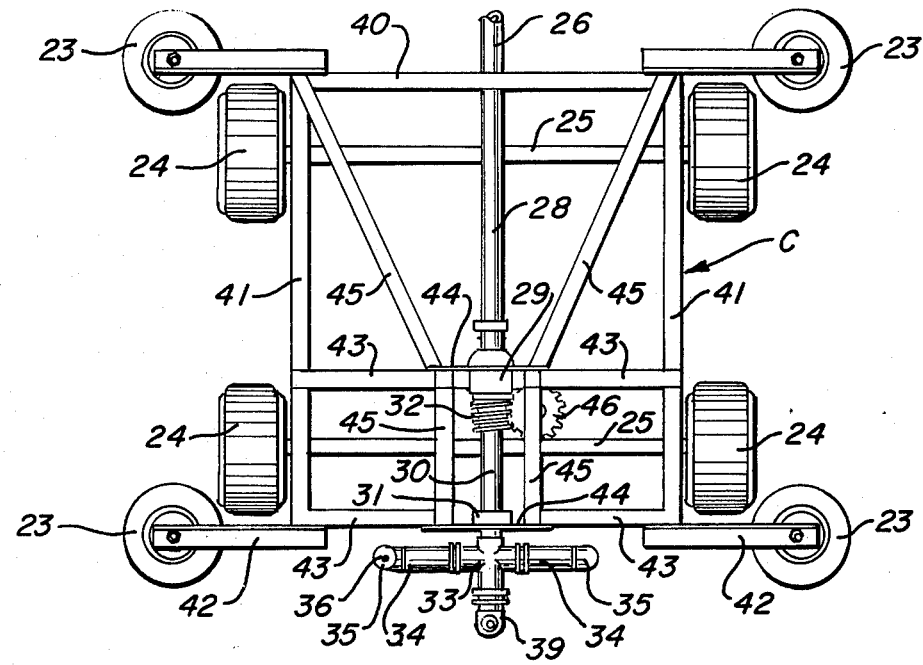
FIG. 3 is a top plan view of a carriage which moves forwardly from back to front and then rearwardly within the trailer to be washed.

The apparatus of this invention is particularly adapted to be used in a special building B having a wash tank W, a rinse tank R and a sand trap S, as in FIG. 2. An apron 10 extends upwardly to permit a trailer T to be backed down into washing position, as shown in dash lines in FIG. 2. It will be noted that each rear door 11 of the trailer is folded back along the side, for a purpose described later. The rear wheels 12 of the trailer T are guided into position by guide bars 13 which are spaced above the roadway level in a conventional manner. It will be noted that the trailer wheels straddle the sand trap S, although the sand trap is provided, as in FIG. 2, with grating bars 14. The wash tank W is also provided with grating bars 15, as in FIG. 2. A showing of the grating bars on trap S and tank W are omitted for clarity of illustration. The floor 16 around tank W slopes toward it, while the bottom of each of wash tank W and sand trap S is sloped to a drain outlet.

Figure 4:
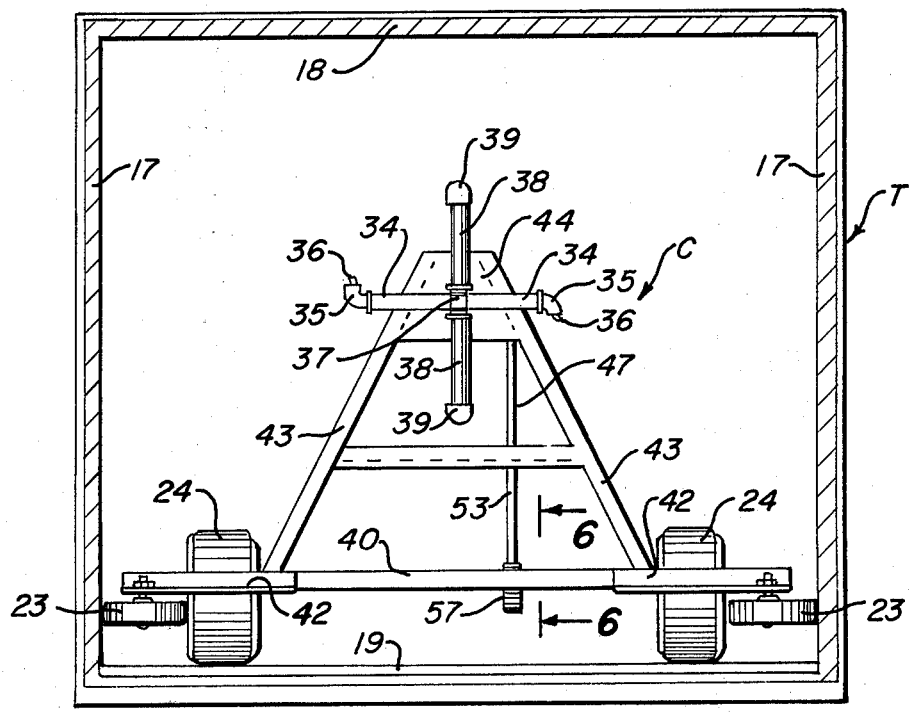
FIG. 4 is a front elevation of the carriage of FIG. 3 but shown within the trailer being washed.

As in FIG. 4, a carriage C is moved inwardly of the trailer body and then outwardly thereof, for spraying first wash water and then rinse water onto the trailer sides 17, top 18 and floor 19. Since the nozzles are preferably provided to discharge a jet of wash water or rinse water at a suitable pressure, the effect of the water is not merely a spray, but is rather forceful to remove any meat, fat or the like clinging to the side walls, top or bottom of the trailer. Due to the upward inclination of the trailer on the apron 10, the volume of cleaning liquid is such that substantially all loosened material will flow along the floor and drain back into the wash tank.

The rear edge of the trailer, when in cleaning position, abuts against and compresses a pair of vertical sponge pads 20 at each side and a pair of horizontal, upper and lower sponge pads 21. With the trailer sealed around the edges of its rear opening, the washing liquid and the rinse water are prevented from flowing into the space above the sand trap and are constrained to flow rearwardly into the wash tank.

The carriage C is provided with guide rollers 23 which engage the inside of the sides 17 of the trailer, as in FIG. 4. The carriage is supported by a series of wheels 24, such as four in number, with an axle 25 for each pair, one axle 25 being a drive axle. Wheels 24 are relatively wide, since the carriage moves rearwardly onto the spaced grating bars 15 over wash tank W. The wash water, as well as the rinse water, is supplied through a hose 26 which is rolled on a reel 27 at the rear of the building and is connected to a pipe 28 which extends upwardly to a sealing joint 29 in which a stub pipe 30 rotates. Stub pipe 30 also rotates in a bearing 31, while a worm 32 is mounted on the stub pipe 30, for the purpose of driving a machine inwardly of the trailer, in a manner described below. Attached to the outer end of the stub pipe 30 is a cross 33, while attached at opposed lateral positions of cross 33 are pipes 34, each provided at its outer end with an ell 35 in which a nozzle 36 is mounted, the water discharge from the nozzles 36 being essentially perpendicular to the corresponding pipe 34, so that the reaction of the jets of water discharged from the nozzles 36 will rotate the stub pipe 30. Attached to the front flange of cross 33 is a tee 37 to which opposed pipes 38 are attached, for discharging jets of water laterally through nozzles 39. As will be evident, the jets discharged by the nozzles 39 will be perpendicular to the plane of travel of the carriage. As indicated previously, the jets of water discharged by the nozzles 36 are essentially perpendicular to the pipe 30, although the nozzles may be adjusted, so that the jets of water are spread somewhat, particularly forwardly, so that the front wall of the trailer will receive the washing solution and later the rinse water.

The carriage C may include a lower rectangular framework having front and rear bars 40 connected by side bars 41 under which the axles 25 are journaled.

The guide rollers 23 are carried by adjustable bars 42, such as angles, which may be adjusted on the framework to accommodate trailers of possibly different widths. However, the inside widths of trailers are relatively standard, so that little adjustment is normally necessary after the bars 42 have been adjusted for one trailer. However, the height of trailers may vary considerably but, as will be evident, the rotating nozzles located centrally, as they are, will direct jets against the side walls, floor and ceiling of any trailer, irrespective of a variation in height or width.

The frame of the carriage C further includes a pair of upwardly sloping bars 43 at each side, connected together at the top by a gusset plate 44, with a pair of top bars 45 extending between the upper ends of bars 43. A pair of inclined struts 45 extend upwardly from the lower rear corners of the framework to the upper end of the corresponding rear bar 43.

Figure 5:
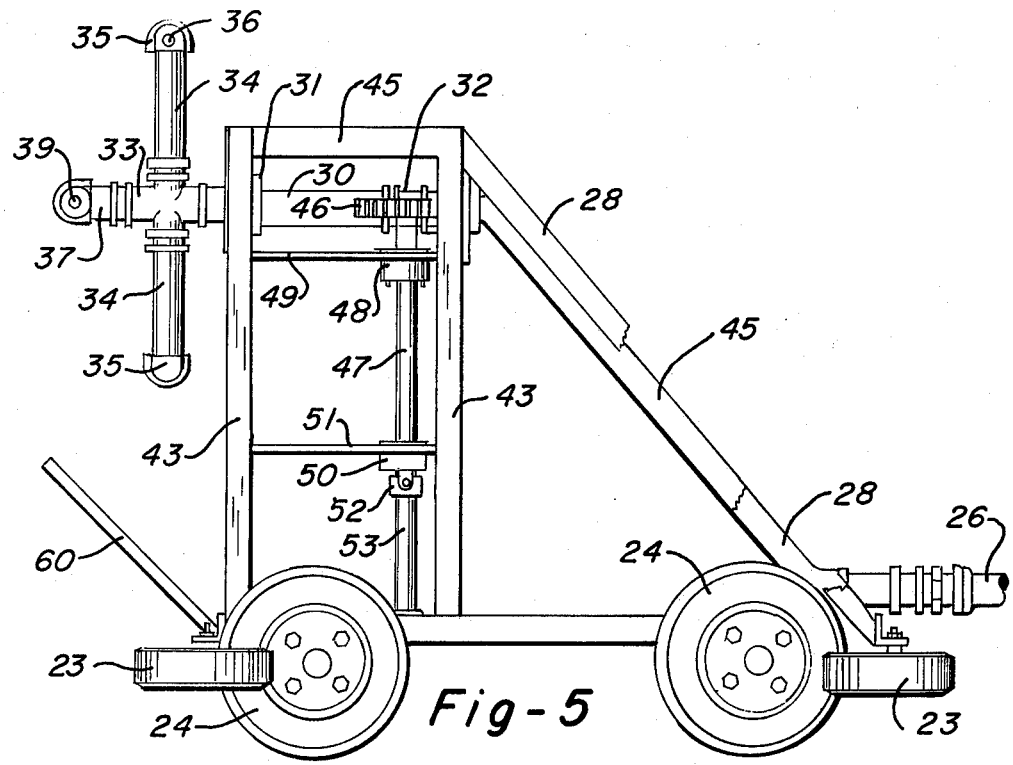
FIG. 5 is a side elevation of the carriage of FIG. 3.
Figure 6:
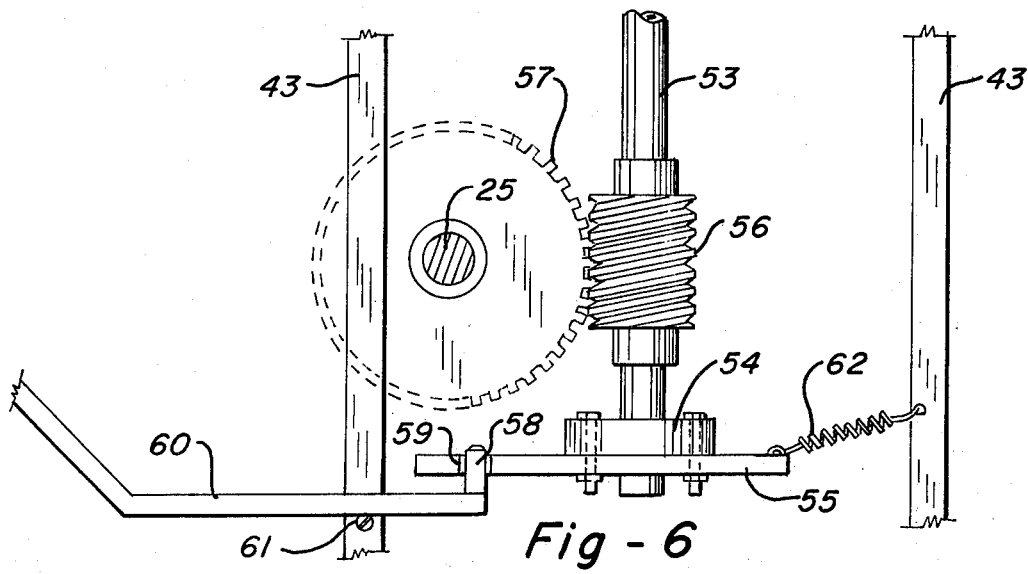
FIG. 6 is an enlarged vertical detail, taken from line 6—6 of FIG. 4.

The drive to the front axle 25 includes a worm gear 46 which meshes with worm 32 and is mounted at the top of an upper, upright shaft 47 extending through a bearing 48 mounted on a plate 49 which extends between the gusset plates 44 and also through a bearing 50 mounted either above or below a transverse plate 51 which is adjustable in position and connected to the bars 43. A universal joint 52 connects the upper shaft 47 with a lower shaft 53, the lower end of which is journaled in a bearing 54 mounted on a floating plate 55 and provided with a worm 56 which engages a worm gear 57 mounted on the drive axle 25. Normally, the worm 56 engages worm gear 57, being held in engaged position by a latch pin 58, as in FIG. 6, which engages a hole 59 in bearing plate 55. Latch pin 58 is mounted on a lever 60 pivoted on a rod 61, while the front end of lever 60 is inclined upwardly, extending to the position shown in FIG. 5. As the carriage C moves inwardly of the trailer, when the front end of lever 60 engages the front wall, the lever 60 will be pivoted upwardly and pull latch pin 58 out of hole 59. When this event occurs, a spring 62 of FIG. 6 will pull the worm 56 away from the worm gear 57 and the carriage will no longer be driven forwardly.

At this time, the operator may start motor 65 to drive reel 27 and rewind hose 26 thereon, thereby pulling the carriage rearwardly out of the trailer. Depending upon the condition of the trailer, the washing solution may be continued on the reverse movement of the carriage, but ordinarily he stops a motor 66 which drives a wash water pump 67 for supplying wash water from the wash tank through a line 68 provided with a valve 69. After stopping pump 67 and closing valve 69, the operator will open a valve 70 in a line 71 leading from the rinse tank R to a pump 72 driven by a motor 73. Thus, the operator will then start motor 73 to start pump 72. Both pump 67 and pump 72 are connected, as shown, to a special joint 74 by which wash water or rinse water, as the case may be, will be supplied to hose 26 through a hollow shaft of reel 27.

The building B is provided with side walls 76 and a rear wall 77, together with a transverse partition 78 and a conventional roof 79 in which a pressurizing fan 80 is installed. A set of double doors 81 is located in partition 78, while a second partition 82 is provided with side doors 83 and an overhead door 84 which may be opened when a trailer is to be washed. While the carriage C is moving into the trailer, the operator may stand on one of ramps 85, to which stairs 86 lead from the front, by going through one of side doors 83. Thus, the operator may wash by hand the inside of each of the rear doors 11, conveniently washing one door while the carriage is moving into the trailer and washing the opposite door while the carriage is moving out of the trailer. Alternatively, one operator may control the carriage C, while another employee washes the end doors 11, when folded back.

Figure 1:
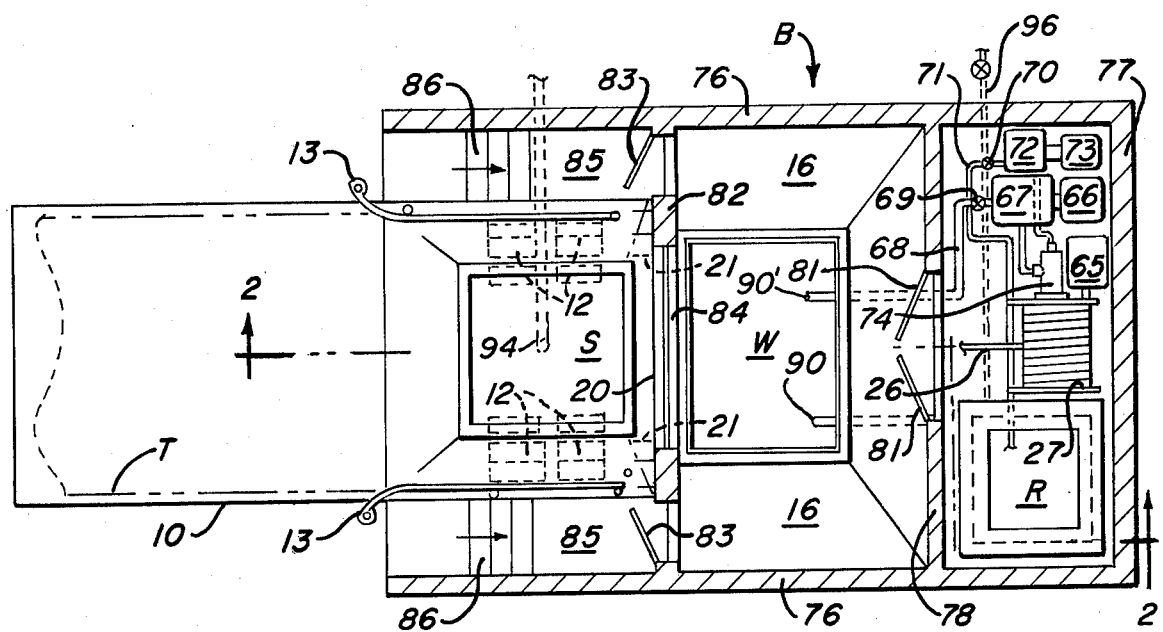
FIG. 1 is a horizontal section taken along line 1—1 of FIG. 2 through the building in which a trailer washing apparatus constructed in accordance with this invention is installed.

A boiler 88, as in FIG. 2, is mounted over rinse tank R, along with a motor driven pump 89 for recirculating water from the wash tank W through the boiler, with a line to the pump leading from an intake 90 in wash tank W and a suitable line leading back from the boiler. A similar intake 90' may be connected with line 68, while each intake 90 and 90' may be provided with a foot valve. Wash tank W may also be provided with an overflow 91 and a valve controlled port 92 leading to a line connected with sand trap S, in turn provided with an overflow line 93 and a drain 94. A float 95 of rinse tank R controls a valve through which fresh water is supplied to the rinse tank from an outside line 96 of FIG. 1.

As will be evident, the trailer T, with its rear doors 11 open and placed at the sides of the trailer, abuts the sealing strips 20 and 21 and the water used for washing and rinsing purposes will drain rearwardly on the trailer floor and then into the wash tank W. Preferably, a ramp 97 which covers a portion of the grate bars 16 of the wash tank W and extends onto the rear edge of the floor of the trailer is utilized to move the carriage C into and out of the trailer. It is desirable to heat the wash water in the tank W, to which a suitable detergent or soap and pumice may be added, to as close to the boiling point as possible by the boiler 88, so that a considerable amount of water vapor is produced. The doors 81 have a notch in the bottom to accommodate the hose 26, in the event that the operator wishes to stay in the pump room, as it were, while the trailer is being washed to avoid the heated vapors produced by the washing. Of course, the fan 80 which drives outside air into the room and pressurizes it prevents the escape of a considerable amount of heat to the atmosphere.

It will be noted that the jets produced by the nozzles do not spread materially in reaching the walls, floor and ceiling. Thus, for a ¼ inch nozzle, the jet will expand to not more than 1½ to 2 inches in diameter when it hits an inside wall of the trailer. Thus, there is considerable splashing of the wash water, as well as of the rinse water, which results in the front of the trailer being washed without specifically directing a jet thereagainst. An advantage of the device of this invention is that the galvanized meat hooks, on which meat is hung in the trailer, can be hung from the outer channels of the ceiling of the trailer and thus washed along with the rest of the trailer interior.

Figure 7:
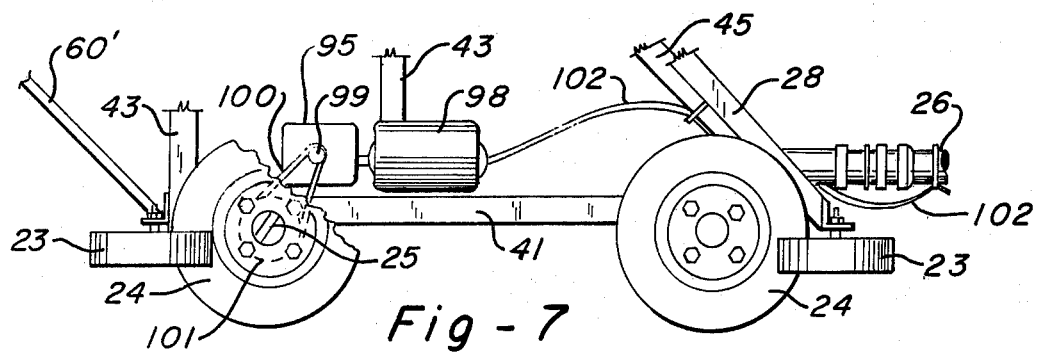
FIG. 7 is a fragmentary side elevation of an alternative carriage which is driven by an electric motor.

In FIG. 7 is shown an electrical drive including an electric motor 98 connected to a speed reducer 99 on whose output shaft is mounted a pulley 100 for driving the shaft through a V-belt or the like, which also engages a ratchet pulley 101 on drive shaft 25. An electrical cord 102 for the motor is attached to the hose 26 to insure the same rate of movement of the cord as the hose. It will be noted that the motor operates in only one direction, i.e. to move the carriage forwardly in the trailer, so that the lever 60' may actuate a stop switch to stop the carriage when it reaches the front end of the inside of the trailer.

When using the electric motor drive, the carriage is still returned by winding the hose 26 on reel 27 with the motor 98 stopped and the ratchet pulley 101 permitting the carriage to move rearwardly without interference by the motor drive. The use of a hose to pull the carriage rearwardly eliminates any problem of synchronizing any rearward movement by motor 98 with the reeling of the hose. In utilizing either drive, an appropriate rate of movement is produced, such as approximately four minutes for the carriage to move from the rear end to the front end of the trailer and on the order of three minutes on the return stroke during rinsing.

Although a preferred embodiment of this invention, together with a variation, has been illustrated and described, it will be evident that other embodiments may exist and various changes made, all without departing from the spirit and scope of this invention.

What is claimed is:

1. Apparatus for washing an interior space of trailers and the like, comprising:
    a carriage having support wheels and means for driving said wheels;
    a rotatable nozzle means for causing an impingement of cleaning fluid on the inner surfaces of said trailer space;
    means for rotating said nozzle means;
    lateral rollers for spacing said carriage in the interior of said trailer;
    a hose for supplying liquid to said nozzle means;
    a reel exteriorly of said trailer from which said hose is unreeled as said carriage is moved from the back to the front of said trailer;
    means for rotating said reel to cause said hose to pull said carriage rearwardly in said trailer;
    a wash tank containing liquid for washing the interior surface of said trailer;
    heating means for heating the liquid in said wash tank;
    a rinse tank containing water for use in rinsing the interior of said trailer;
    pumping means for pumping said washing liquid to said reel and said hose;
    pumping means for pumping rinse water to said reel and to said hose;
    an opening in a partition in a building containing said wash tank and said rinse tank;
    resilient pads surrounding an opening in said partition; and
    a downwardly sloped ramp on which said trailer may be placed with the rear end engaging said resilient pads, the slope of said ramp imparting a slope to the floor of said trailer so that wash water and rinse water applied to the interior of said trailer will flow down the floor of said trailer and into said wash tank.

2. Apparatus for washing an interior space of trailers and the like, comprising:
    a carriage having support wheels and means for driving said wheels;
    means for guiding said carriage laterally while within said trailer space;
    a rotatable nozzle means for causing an impingement of cleaning fluid on the inner surfaces of said trailer space;
    lateral rollers for spacing said carriage in the interior of said trailer;
    a hose for supplying liquid to said nozzle means;
    a reel from which said hose is unreeled as said carriage is moved from the back to the front of said trailer;
    a wash tank containing liquid for washing the interior surface of said trailer;
    heating means for heating the liquid in said wash tank;
    a rinse tank containing water for use in rinsing the interior of said trailer;
    pumping means for pumping said washing liquid to said reel and said hose;
    pumping means for pumping rinse water to said reel and to said hose;
    a dock having a drain aperture communicating with said wash tank; and
    a downwardly sloped ramp on which said trailer may be placed to impart a slope to the floor of said trailer and positioned so that wash water and rinse water applied to the interior of said trailer will flow down the floor of said trailer and into said wash tank through said drain aperture.

3. Apparatus as defined in claim 2, including:
    a movable ramp means for supporting said carriage for movement over said aperture means from said dock forwardly into said interior space and from said interior space rearwardly onto said dock.

4. Apparatus as defined in claim 2, including:
    float controlled means for supplying fresh water to said rinse tank; and
    overflow means for said wash tank for maintaining a maximum level of liquid therein.

* * * * *